Sept. 29, 1925.
F. S. HONBERGER
1,555,209
METHOD OF TREATING CONCRETE
Filed May 19, 1924 2 Sheets-Sheet 1
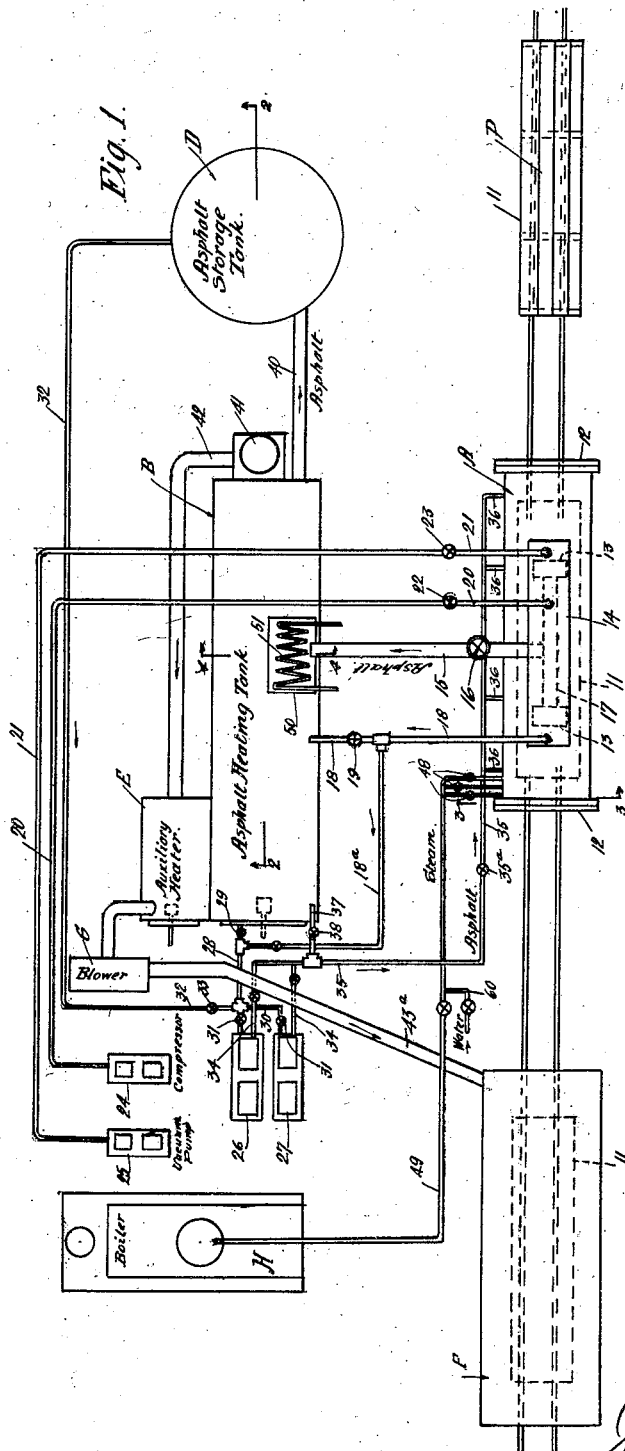
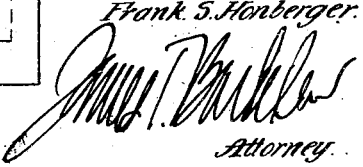

Sept. 29, 1925.
F. S. HONBERGER
1,555,209
METHOD OF TREATING CONCRETE
Filed May 19, 1924   2 Sheets-Sheet 2
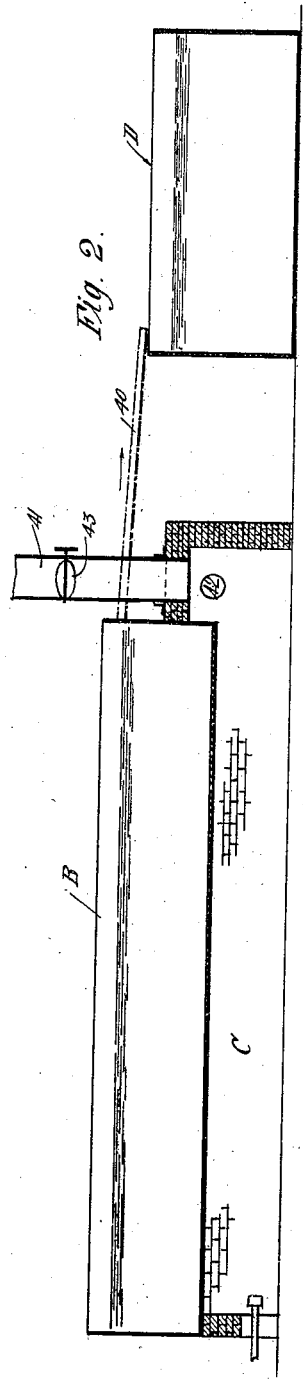
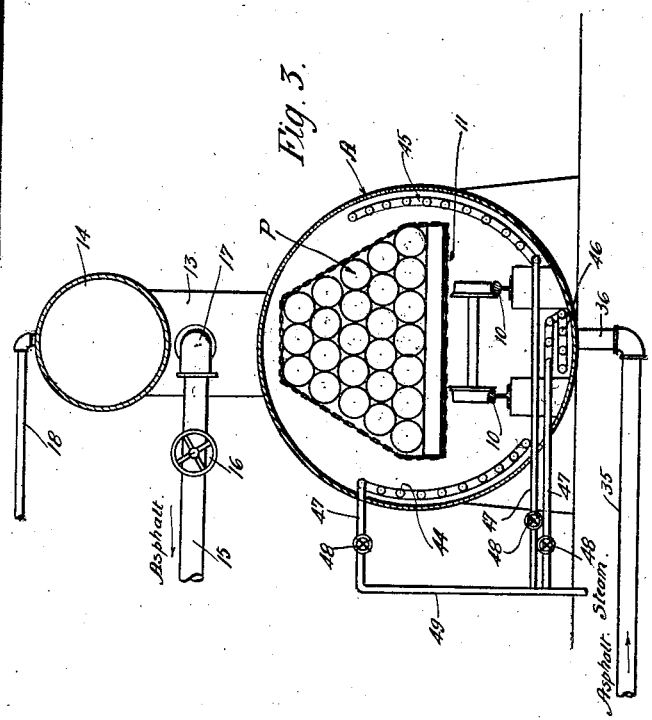
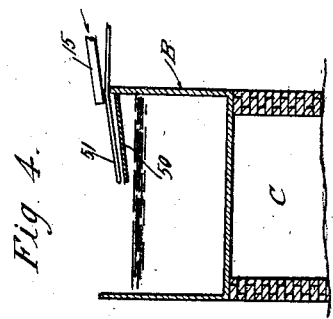
Inventor.
Frank S. Honberger.
Attorney.

Patented Sept. 29, 1925.

1,555,209

UNITED STATES PATENT OFFICE.

FRANK S. HONBERGER, OF LOS ANGELES, CALIFORNIA.

METHOD OF TREATING CONCRETE.

Application filed May 19, 1924. Serial No. 714,245.

*To all whom it may concern:*

Be it known that I, FRANK S. HONBERGER, a citizen of the United States, residing at Los Angeles, in the county of Los Angeles and State of California, have invented new and useful Improvements in Methods of Treating Concrete, of which the following is a detailed specification.

This invention has to do with impregnating Portland cement concrete or like porous bodies with a water proofing or other substance; and although the invention is not necessarily limited to the impregnation of any particular bodies with any particular impregnating substance, I shall, for the purposes of this description, set out the invention as applied to the impregnation of such concrete with asphalt.

I have found that in the practical economical impregnation of Portland cement concrete with asphalt for the purpose of waterproofing and protecting the concrete, several difficulties are encountered. For instance, in such a process it is desirable, from the standpoint of economy and efficiency, to heat the concrete in a bath of liquid asphalt, so that the air and the water contained in the interstices of the concrete shall be expanded and vaporized in the immediate presence of the asphalt and while the concrete body is submerged therein, so that upon cessation of heating and subsequent cooling of the concrete body the asphalt is immediately present to be drawn in to the interstitial spaces by the contraction and condensation of the gases and vapors in the interstitial spaces. In this mode of operation, however, air and water vapor bubbling out through the asphalt form a large quantity of foam; to such an extent, in fact, that if the foam is not removed there will not be a solid body of liquid asphalt in contact with the concrete body to be drawn into the body on subsequent cooling. If this foam is not removed, any more or less complete vacuum that may have been formed for the purpose of drawing the asphalt into the voids is destroyed or rendered ineffective by the presence of the air or water vapor in the asphalt. It is one of the objects of this invention to provide means and methods to overcome this difficulty, and to remove the foam from contact with the concrete body.

It may also be an object of the invention to provide a procedure whereby heat may be more economically used in the process by applying it to the purpose of preheating the concrete bodies before they are put into the treating chamber. In order to do this it is necessary, if the efficiency of the impregnation operation is not to be impaired, to preheat the concrete body only to a temperature somewhat below the boiling point of water, so that the vaporization and expansion of the contained water is left to be accomplished in the treating chamber. The preheating also minimizes danger of cracks, etc. developing in the concrete, as it relieves stresses and strains that might be developed were the concrete heated immediately to the final higher temperature.

These and various other objects and corresponding accomplishments of the invention will be best understood from the following detailed specification wherein I describe the invention as applied to impregnating concrete piles with asphalt; and for that purpose I refer to the accompanying drawings in which:

Fig. 1 is a diagrammatic plan of a plant layout for practicing the invention;

Fig. 2 is an enlarged detail section on line 2—2 of Fig. 1.

Fig. 3 is an enlarged cross-section on line 3—3 of Fig. 1; and

Fig. 4 is an enlarged cross-section on line 4—4 of Fig. 1.

In the drawings the impregnating chamber is shown at A, an asphalt heating tank at B with a furnace C beneath it, and an asphalt storage tank at D. At E is an auxiliary heater for supplying additional heat to the preheating chamber F if desired, a blower being provided at G to blow the flue gases to the preheating chamber. At H is a boiler for supplying steam for the various pumps and steam for heating as desired.

Impregnating chamber A may be a cylindrical chamber of any suitable size and length with rails 10 extending through it. These rails extend outside the impregnating chamber and on them travel the cars 11 that carry piles P. Rails 10 also extend through the preheating chamber F, which may be more or less of the nature of an ordinary dry kiln. Impregnating chamber A is provided with movable heads or doors 12 at its ends adapted to be so secured as to hold pressure or vacuum. The details of securing these heads or doors, and the detailed arrangement of the tracks at the doors, need not be entered into here as such details are well known. Above chamber A and connected to it by two stand-pipes 13 is a head chamber 14 whose capacity is designed to be approximately equal to the amount of asphalt that will be absorbed into the maximum charge of piles put into chamber A at one time. An asphalt outlet pipe 15 controlled by a valve 16 leads from a cross-pipe 17 that communicates with both standpipes 13 below head chamber 14. Also another asphalt outlet pipe 18 runs out of the top of head chamber 14 and delivers into the asphalt heating tank B, controlled by valve 19. And to the upper part of head chamber 14 there lead an air pressure pipe 20 and a vacuum pipe 21 controlled by valves 22 and 23, respectively, these pipes being connected, respectively, with a compressor 24 and a vacuum pump 25. Two asphalt pumps 26 and 27 are preferably provided for circulating the asphalt and also for pumping it from place to place as desired, two being provided so that the operations may be kept up continuously if one pump needs repair. Although of course the piping system for circulating of the asphalt may be arranged in any suitable manner, the piping system illustrated in the drawings will suffice for description of the various operations in the system. For instance, from the asphalt heating tank B a pipe 28 controlled by valve 29 leads to a pump intake pipe 30 from which either or both the pumps are fed under control of valves 31. Also connected with this pump intake pipe is a pipe 32 controlled by valve 33 and leading from the asphalt storage tank D. The outlet pipes 34 of the two pumps are connected to a circulation pipe 35 controlled by valve 35ª, which goes to impregnating chamber A, this pipe having a number of branches 36 that lead into the bottom of the impregnating chamber at points spaced along its length. In treating piles, which are sometimes of considerable length, it is necessary that the impregnating chamber be quite long, (a great deal longer in proportion to its diameter than is illustrated in Fig. 1); and in order effectively to remove the foaming asphalt it is necessary that circulation through the tank be uniform throughout its length, and therefore the inflow of asphalt at the bottom of the tank is distributed along the length of the tank A.

Also from asphalt circulating line 35 there is a branch pipe 37 leading off to the asphalt heating tank B, controlled by valve 38. Although the major operation performed by pumps 26 and 27 is to circulate asphalt through the impregnating chamber, and to pump asphalt into the impregnating chamber at the beginning of the operation, yet the pipe system is such that the pumps may be used to pump asphalt from the storage tank either into the impregnating chamber or into the heating tank to make up for the asphalt that has been absorbed in the piles. Thus, for instance, by opening valve 33 on line 32 leading from the asphalt storage tank, and by proper control of valves 35ª and 38, the asphalt may be pumped into the asphalt heating tank or into the impregnating chamber.

From heating tank B an overflow pipe 40 leads to the asphalt storage tank, so that any surplus of asphalt over the amount necessary to fill tank B is always put back into the storage tank. Furnace C under heating tank B has a stack 41 and also has a flue connection 42 to auxiliary heater E. The stack may be controlled by a damper 43 to control the quantity of hot gases that pass through flue 42. The auxiliary heater E may be simply an open furnace fired by a suitable burner for the production of additional heat for preheating chamber F if desired. Normally the waste flue gases from furnace C may be sufficient to operate preheating chamber F. These flue gases from burner C. together with any additional gases developed in the auxiliary heater, are blown by blower G through flue 43ª to preheating chamber F.

In the impregnating chamber A there are steam coils, conveniently arranged in three coils 44, 45, and 46, along the sides and bottom of the chamber and fed with steam through pipes 47, controlled by valves 48, all being fed from a common steam line 49 from the boiler. These coils are for the purpose of keeping up the temperature of the asphalt during the time that the piles are being brought up to temperature in chamber A, and also to receive cooling water during the cooling and impregnating operation. At the discharge of pipe 15 from the impregnating chamber into heating tank B, the asphalt runs over an inclined plate or apron 50 on which there are steam coils 51. The asphalt being thus spread out in a thin stream and coming into contact with the hot steam coils, the water in the foam is evaporated and the foam completely broken up so that the asphalt is in solid liquid form when it drops off into tank B.

In the operation to impregnate, for instance, a concrete pile, finished piles P are placed in suitable number on cars 11 and are first rolled into preheating chamber F. In this chamber the temperature is maintained at a point somewhat below the normal boiling point of the water. While it is desired to preheat the piles with the otherwise waste heat coming from furnace C, it is not desirable to heat the piles to such a temperature that the moisture in the interstitial spaces is vaporized and driven off;

such higher heating and vaporization of the moisture being reserved for the operation in the impregnating chamber, for reasons as will afterwards appear. Accordingly, the temperature in preheating chamber F is maintained in practice, say, close to but never above 200° F.

I may say here that the concrete piles as they come to the plant need not be particularly wet; in fact, it is desirable to have them in the condition that is ordinarily known as dry. In this condition the interstitial spaces still contain a sufficient amount of moisture to make efficient the operations in the impregnating chamber; and although a certain small amount of moisture in the interstitial spaces is desirable for best results in the impregnating operation, the impregnation may be successfully accomplished even if the piles come to the plant or come to the impregnating chamber totally dry and with nothing but air in the interstitial spaces. This condition of absolute dryness, while theoretically possible is however practically nonexistant.

In the operation of the plant one carload of piles is kept in preheating chamber F during the time that the preceding carload of piles is in impregnating chamber A; but when the preceding carload has been moved out of the impregnating chamber, then the preheated carload is moved into the impregnating chamber and the doors or heads 12 tightly closed. The asphalt in heating tank B has been previously heated; in fact, in the operation of the process a charge of asphalt is usually kept continuously hot in this heating tank. The capacity of the heating tank is at least equal to the charge necessary for the impregnating chamber; and preferably its capacity may be somewhat more than that. The carload of piles being now in chamber A, the heated asphalt, heated to a temperature of about 260° F. is pumped by one of the pumps into the impregnating chamber. The temperature used is preferably always above the boiling point of water, but how much above that point depends on the character of the asphalt being used, it being desirable to obtain good fluidity. During this operation valve 16 on asphalt discharge line 15 is open so that when the asphalt reaches the level of pipe 17 it will flow through line 15 back to the asphalt heating tank; and during this part of the operation the asphalt pump is operated continuously to keep up a continuous circulation of asphalt through the impregnating chamber and the heating tank. The heating tank furnace is in operation to keep the asphalt hot, and steam is also admitted to steam coils 44, 45, 46, to keep the asphalt up to proper temperature in impregnating chamber A, so that the piles are also brought up to the temperature of the asphalt. As soon as the piles are brought up to a temperature above normal boiling point the moisture in the interstitial spaces begins to vaporize and bubbles out into the asphalt. A considerable quantity of foam or emulsion is thus made; but the emulsion foam is continuously removed through line 15 and passed back to the asphalt heating tank, the emulsion being broken up where it flows over plate 50, the water passing off as vapor and pure liquid asphalt dropping into tank B. This circulation operation is kept up, and the temperature of the asphalt and of the piles is maintained, until all the moisture has been evaporated and expanded from the piles, and all the air has been expanded from the piles, that can be driven from them by heat expansion at the temperatures employed. This stage of the operation is indicated by the fact that no more emulsion foam flows from line 15, the asphalt flowing from that line being then a solid liquid.

As soon as this takes place valve 16 is closed and the asphalt pump continues to operate until head chamber 14 of the impregnating chamber is full of asphalt, that fact being indicated by the overflow of asphalt through line 18 back to heating tank B. Then the pumps are stopped and steam is cut off from the steam coils in the impregnating chamber and the piles allowed to cool submerged in the asphalt. To facilitate this cooling water may be run through the steam coils in the impregnating chamber; and for this purpose the water line 60 may connect with steam line 49. It is only necessary to cool the asphalt and the piles down to a point somewhat below normal water boiling point. In practice, the piles and asphalt are cooled down to about 150° F. At this temperature the asphalt is still at least somewhat liquid. During this cooling operation and when the temperature passes below normal boiling point, the air in the interstitial spaces has of course contracted in volume and the water vapor has contracted and condensed. Although the contraction of air in the interstitial spaces, while the piles are submerged, is sufficient to draw in the asphalt to a very considerable extent, it is mainly the water vapor condensation that is effective in drawing in the asphalt to such an extent that the asphalt penetrates and fills all the interstitial spaces throughout each pile.

It will be seen that the asphalt is drawn into the interstitial spaces by vacuum action due to contraction and condensation within those spaces. However, I find it desirable to aid this vacuum action by applying pressure to the asphalt during the cooling operation. A pressure of approximately 125 lbs. per square inch I find very effective in hastening the impregnation, thus shortening the time element of the operation, and in making absolutely sure the thorough and full impregnation of each pile. This pressure on the asphalt not only speeds up the impregnation by direct pressure action, but also hastens the drawing in of the asphalt because, by increasing the pressure on the water vapor in the interstitial spaces, it acts in conjunction with the cooling to induce the condensation of the water vapor and thereby increases the suction action. This application of pressure is accomplished merely by opening the air pressure valve 22 to place pressure above the surface of the liquid asphalt, all other valves to the impregnating chamber being closed. As the liquid asphalt is absorbed by the piles its level falls, but the capacity of head chamber 14 is designed to be at least equal to the absorption capacity of a load of piles, so that during the whole cooling and impregnating operation the piles are always submerged in the liquid asphalt.

Also, in order to hasten the action on the piles, I may apply vacuum in the same general manner set forth in my co-pending application, Serial No. 616,864, filed February 3, 1923, entitled Method of treating concrete.

When the piles have been pre-heated and then put into chamber A, the vacuum is applied to that chamber by opening valve 23 after the chamber has been otherwise entirely closed. Steam is at this time admitted to the steam coils to keep up the temperature of the pre-heated piles; and the pressure reduction in the chamber then has the effect of causing moisture evaporation and exhaustion of the vapor and air from the interstitial spaces. Then, when this evaporation and exhaustion are as complete as may be at the temperature and pressure employed, the asphalt is put into the chamber. As the asphalt level rises the vacuum is still maintained, until the asphalt level is up to the circulation outlet. Then vacuum is cut off, the circulation outlet valve 16 opened, and circulation begun as before described. Circulation is then kept up until the piles have come up to the temperature of the concrete and until foaming is completed.

Such use of applied vacuum not only hastens the evacuation of the interstitial spaces but also minimizes the amount of air and vapor that must come off in foam form in the asphalt. The use of vacuum before introduction of asphalt may also eliminate the necessity of pumping the asphalt into chamber A, as it may be drawn in by the vacuum.

It will also be noted, in connection with the use of applied vacuum, that it may not be necessary, although in the average case it is the practice, to heat the piles to a temperature higher than the pre-heating temperature. Where vacuum is not used the final active suction vacuum in the interstitial spaces is caused by further heating the piles above the moisture vaporizing point and then cooling them in the asphalt. When vacuum is used the final suction vacuum is the result of both the applied vacuum and the moisture vaporization and cooling. But where vacuum is used it will be noted that the reduced pressure causes vaporization of moisture just like increased temperature causes vaporization; and therefore it may not be necessary in that case to cause vaporization by further heating. Under some circumstances it is desirable to circulate the asphalt during the impregnation and cooling operation, and to circulate it under pressure if pressure is used. Such circulation, without depending upon the uncertain convection currents in the asphalt caused by differences in temperature at different points, keeps the asphalt moving and keeps it and the piles at uniform temperatures throughout during the cooling and impregnation operation, and thus insures uniform impregnation. If it is desired to so circulate the asphalt the pumps are operated as before to pump asphalt into the bottom of the tank and the asphalt flows out then through pipe 18 and through pipe 18ª back to the pump in a closed circuit.

It is one of the advantages of the present invention that the concrete need not be heated to excessively high temperatures in order to get good and thorough impregnation. The reason why such high temperatures are not necessary in this process have been made plain in the foregoing. And it is highly desirable not to heat concrete to any high temperature because such temperatures may deteriorate the concrete; for instance, it may cause development of unequalized stresses and strains that will result in rupture; and further it may cause deterioration due to unequal expansion and contraction of the concrete and the reinforcing steel which piles for instance usually contain.

After the piles have cooled, in the asphalt, to a temperature below normal water boiling point, the asphalt is removed from Chamber A by applying air pressure above and opening valve 38 that leads from line 35 to heating tank B. The piles may then be removed from chamber A and allowed to cool to normal temperature in the atmosphere.

This application describes in some particulars, as for instance in the use of applied vacuum in my copending application Serial No. 616,864, filed February 3, 1923, entitled Method and apparatus for treating concretes; but in so far as common subject matter is involved the claims are made in said application; this present application being restricted in its claims to the subject matter peculiar to this application.

Having described a preferred form of my invention, I claim:

1. The process of impregnating a concrete or other porous body with an impregnating liquid, that includes maintaining two heated volumes of the impregnating liquid in one of which the body is submerged, the body being brought up to substantially the temperature of the liquid by transfer of heat therefrom, circulating the liquid from each heated volume to the other, thereby carrying away from the body the foam formed by the expansion and escape of gases from its interstitial spaces into the liquid, and breaking up the formed foam during circulation of the liquid, then allowing the body to cool in the liquid.

2. The process of impregnating a concrete or other porous body with an impregnating liquid, that includes submerging the body in a heated volume of the liquid and bringing the body up to substantially the temperature of the liquid, meanwhile circulating heated liquid into the submergence volume and taking away from the volume the foam that results from the expansion and escape of gases from the interstitial spaces of the body into the liquid, and then allowing the body to cool in the liquid.

3. The process of impregnating a concrete or other porous body with an impregnating liquid, that includes maintaining two heated volumes of the impregnating liquid in one of which the body is submerged, the body being brought up to substantially the temperature of the liquid by transfer of heat therefrom, circulating the liquid from each heated volume to the other, thereby carrying away from the body the foam formed by the expansion and escape of gases from its interstitial spaces into the liquid, and breaking up the formed foam during circulation of the liquid, then allowing the body to cool in the liquid, applying pressure during the cooling to the liquid volume in which the body is submerged and continuing to circulate the liquid through said last mentioned volume during the cooling so as to maintain an even fall of temperature throughout the body.

4. The process of impregnating a concrete or other porous body with an impregnating liquid, that includes heating a volume of the impregnating liquid to a temperature above the normal boiling point of water, preliminarily heating the body to a temperature under the normal boiling point of water so as to heat the body without vaporizing the water in its interstitial spaces, then while maintaining the temperature of the body applying vacuum to it to cause vaporization of the contained moisture and expansion and removal of the contained vapor and gases, then submerging the body in the heated impregnating liquid and heating the body in the liquid to a temperature above normal water boiling point, thereby causing further expansion of contained gases and vapors from the body outwardly into the liquid, meanwhile circulating the liquid to remove the foam, then when foaming is complete cooling the body in the liquid to a temperature below normal water boiling point to contract and condense the gases and vapors in the interstitial spaces and draw in the impregnating liquid, and then allowing the body to cool to normal temperature in the atmosphere.

5. The process of impregnating a concrete or other porous body with an impregnating liquid, that includes submerging the body in a heated volume of the liquid and bringing the body up to substantially the temperature of the liquid, the liquid being maintained at a temperature that causes vaporization of the water contained in the interstitial spaces of the body at the pressure employed, meanwhile circulating heated liquid into the submergence volume and taking away from the volume the foam that results from the expansion and escape of gases and vapors from the interstitial spaces into the liquid, and then after such foaming has ceased, changing the relation between temperature and pressure applied to the liquid to cause re-condensation and contraction of the remaining vapors and gases in the interstitial spaces and thus causing the impregnating liquid to be drawn into the body.

FRANK S. HONBERGER.